(12) United States Patent
Irie

(10) Patent No.: US 11,009,141 B2
(45) Date of Patent: May 18, 2021

(54) PIEZOELECTRIC ACTUATOR AND PIEZOELECTRIC VALVE

(71) Applicant: SINFONIA TECHNOLOGY CO., LTD., Tokyo (JP)

(72) Inventor: Susumu Irie, Tokyo (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 182 days.

(21) Appl. No.: 16/349,407

(22) PCT Filed: Jul. 14, 2017

(86) PCT No.: PCT/JP2017/025659
§ 371 (c)(1),
(2) Date: May 13, 2019

(87) PCT Pub. No.: WO2018/087959
PCT Pub. Date: May 17, 2018

(65) Prior Publication Data
US 2019/0264827 A1     Aug. 29, 2019

(30) Foreign Application Priority Data
Nov. 14, 2016  (JP) .............................. JP2016-221198

(51) Int. Cl.
*F16K 31/00* (2006.01)
*B06B 1/06* (2006.01)
(Continued)

(52) U.S. Cl.
CPC ................ *F16K 31/00* (2013.01); *B06B 1/06* (2013.01); *F01L 9/20* (2021.01); *F16K 31/02* (2013.01);
(Continued)

(58) Field of Classification Search
CPC .. F16K 31/00; F16K 31/02; F01L 9/20; F01L 9/24; H02N 2/06; H02N 2/14; B06B 1/06
See application file for complete search history.

(56) References Cited

U.S. PATENT DOCUMENTS 7,360,750 B2 * 4/2008 Yano ....................... B07C 5/363
251/129.07
8,314,531 B2 * 11/2012 Sunaga ................. H01L 41/042
310/317
(Continued)

FOREIGN PATENT DOCUMENTS

JP         2011-87455 A       4/2011
JP         2011-143099 A      7/2011
(Continued)

OTHER PUBLICATIONS

Offfice Action dated Nov. 24, 2020, issued in counterpart JP Application No. 2016-221198, with English translation. (9 pages).
(Continued)

*Primary Examiner* — Eric Keasel
(74) *Attorney, Agent, or Firm* — Westerman, Hattori, Daniels & Adrian, LLP

(57) ABSTRACT

In an invention including: a piezoelectric element (13) which generates, as a displacement, a driving force necessary for an operation of a valve body (12) which is an operating body; a displacement enlarging mechanism (14) including at least a spring element so as to enlarge a displacement of the piezoelectric element (13) which acts on the valve body (12); and a driving device (15) which operates the valve body (12) by applying a voltage to the piezoelectric element (13) to extend the piezoelectric element (13), the driving device (15) includes a first filter processing unit (15x) having an inverse function characteristic of a mechanical resonance frequency when operating the displacement enlarging mechanism (14), and is config-
(Continued)

ured to apply, a voltage which reduces the mechanical resonance, to the piezoelectric element (13) through this resonance suppression processing unit (15x).

10 Claims, 9 Drawing Sheets

(51) Int. Cl.
*H02N 2/06* (2006.01)
*H02N 2/14* (2006.01)
*F16K 31/02* (2006.01)
*F01L 9/20* (2021.01)
*F01L 9/24* (2021.01)

(52) U.S. Cl.
CPC ............... *H02N 2/06* (2013.01); *H02N 2/14* (2013.01); *F01L 9/24* (2021.01)

(56) References Cited

U.S. PATENT DOCUMENTS

| | | |
|---|---|---|
| 8,662,312 B2 | 3/2014 | Ito et al. |
| 8,833,566 B2 | 9/2014 | Ito et al. |
| 9,114,430 B2 | 8/2015 | Ito et al. |
| 2011/0068657 A1 | 3/2011 | Sunaga et al. |
| 2012/0126157 A1 | 5/2012 | Beck et al. |
| 2015/0060337 A1 | 3/2015 | Ito et al. |

FOREIGN PATENT DOCUMENTS

| | | |
|---|---|---|
| JP | 2012-528557 A | 11/2012 |
| JP | 2014-127533 A | 7/2014 |
| JP | 5631631 B2 | 11/2014 |
| JP | 2015-85278 A | 5/2015 |
| JP | 2016-32939 A | 3/2016 |
| WO | 2013/157548 A1 | 10/2013 |

OTHER PUBLICATIONS

International Search Report dated Sep. 5, 2017, issued in counterpart application No. PCT/JP2017/025659 (2 pages).
Extended (Supplementary) European Search Report dated Jun. 19, 2020, issued in counterpart EP Application No. 17869630.8. (8 pages).

* cited by examiner

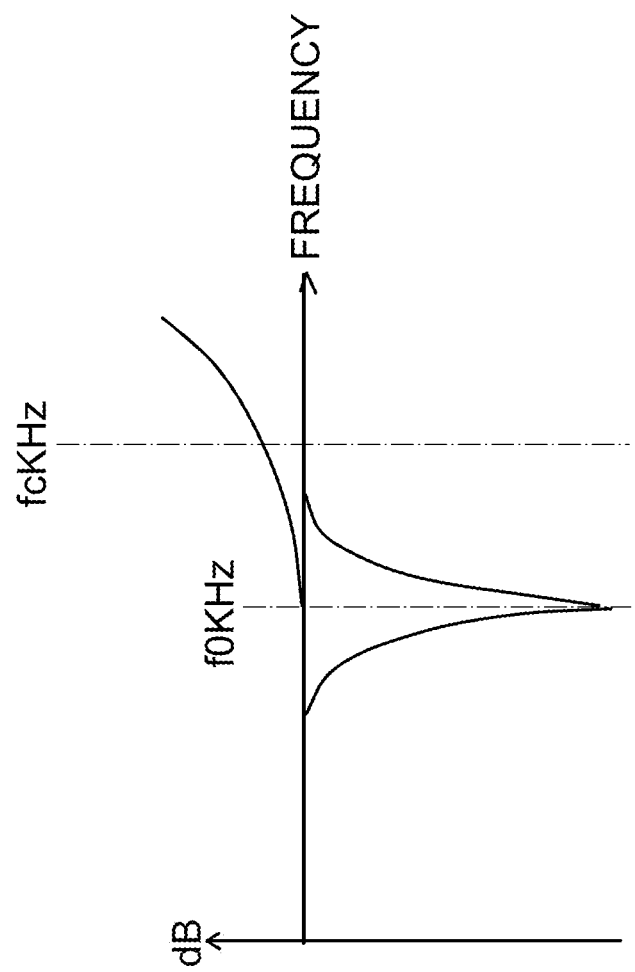

PIEZOELECTRIC ACTUATOR AND PIEZOELECTRIC VALVE

TECHNICAL FIELD

The present invention relates to a piezoelectric actuator and a piezoelectric valve which drive an object by enlarging a displacement of a piezoelectric element (piezo element).

BACKGROUND ART

As a piezoelectric valve using this type of piezoelectric actuator, those disclosed in Patent Documents 1 and 2 are known.

The piezoelectric valve shown in FIG. 1 of Patent Document 1 incorporates a piezoelectric actuator. Expansion and contraction operations of the piezoelectric actuator open and close a valve portion at a tip of the actuator.

In a case of high-speed application, a normal pulse drive voltage shown in FIG. 2(a) of the same document is applied to a piezoelectric actuator. In this case, in view of an occurrence of an output fluctuation of a valve output shown in FIG. 2(b) of the same document, this pressure fluctuation is suppressed by applying a voltage in a multistage manner as shown in FIG. 3 and FIG. 4 of the same document.

Meanwhile, Patent Document 2 illustrates an example in which vibration is suppressed by inserting a prepulse such as that shown in FIG. 4B, FIG. 5A or the like of the same document.

CITATION LIST

Patent Literature

Patent Document 1: Japanese Patent No. 5631631
Patent Document 2: WO2013/157548

SUMMARY OF THE INVENTION

Problem to be Solved by the Invention

In the invention of Patent Document 1, a piezoelectric air valve moves a valve body through a displacement enlarging mechanism, and therefore the invention is carefully devised to apply a voltage under a recognition that the valve body vibrates and an air jet amount from a nozzle fluctuates when an air jet duration time becomes long and stable operation cannot be obtained. However, although not clearly described in Patent Document 1, in the invention of the same document, as a result of the present inventor's examination, it has become clear that a pressure fluctuation is due to a mechanical resonance of the piezoelectric actuator, and vibration due to resonance occurs during expansion and contraction of the piezoelectric actuator, and this is mainly due to changes in an opening of a valve portion.

In view of this, it is considered that Patent Document 1 has the following problems to be solved.
i) Even in a case of a drive voltage waveform of a two-stage output described in the same document, a pulse waveform includes a frequency component of a piezoelectric actuator, and thus an effect of suppressing resonance vibration is low.
ii) Since there is no concept of resonance, when a structure is changed, it is necessary to retune with actual parts matching, and it is not known in advance what two-stage output should be made.
iii) The drive voltage waveform of the two-stage output described in the same document (a voltage at a second stage is higher than that of a first stage) is considered to be same as a waveform through a low pass filter with a slow update pitch. In order to suppress resonance vibration, it is effective to set a cutoff frequency of a low-pass filter lower than a resonance frequency of a piezoelectric actuator; however, as a result, a frequency component higher than resonance of the piezoelectric actuator is also reduced from a drive voltage waveform, and therefore, responsiveness of the piezoelectric actuator is poor.

Meanwhile, in the invention of Patent Document 2, it can be expected to remove a resonant frequency component to some extent as long as tuning is performed in iii), and a circuit also becomes simple, and thus iii) is considered to be a good measure; however, the same issues remain with regard to the abovementioned i) and ii).

The present invention has been made in view of such problems, and it is an object of the present invention to provide unconventional piezoelectric valve actuator and piezoelectric valve which can be applied to a piezoelectric valve or the like to cause an operating body such as a valve body to perform an appropriate operation.

Means for Solving the Problem

The present invention has implemented the following means in order to achieve such an object.

That is, the piezoelectric actuator of the present invention includes: a piezoelectric element which generates, as a displacement, a driving force necessary for an operation of an operating body; a displacement enlarging mechanism including at least a spring element so as to enlarge a displacement of the aforementioned piezoelectric element which acts on the aforementioned operating body; and a driving device which operates the aforementioned operating body by applying a voltage to the aforementioned piezoelectric element to extend the piezoelectric element, wherein the aforementioned driving device includes a resonance suppression processing unit having an inverse function characteristic of a mechanical resonance frequency when operating the aforementioned displacement enlarging mechanism, and is configured to apply, a voltage in which the mechanical resonance is reduced, to the aforementioned piezoelectric element through this resonance suppression processing unit.

In this manner, focusing on a fact that a variation of the displacement of the operating body is caused by mechanical resonance vibration due to a spring elasticity of the displacement enlarging mechanism, by identifying a resonance frequency thereof, the resonance suppression processing unit with the inverse function characteristic is properly configured.

Furthermore, in order to properly eliminate a response delay of a drive system, it is preferable that the aforementioned driving device includes a delay compensation processing unit having an inverse characteristic of an electrical driving characteristic causing a delay when driving the aforementioned piezoelectric element, and is configured to apply, a voltage which reduces an influence of the aforementioned electrical driving characteristic, to the aforementioned piezoelectric element through this delay compensation processing unit.

A specific embodiment may include a driving device in which the resonance suppression processing unit is a notch filter, and a driving device in which the delay compensation processing unit is a high pass filter.

If a piezoelectric valve is configured, using such piezoelectric actuator, to include: a valve main body in which a gas pressure chamber receiving compressed gas supplied from an outside and a gas exhaust passage exhausting the aforementioned compressed gas from the gas pressure chamber are formed; and a valve body which is an operating body disposed in the aforementioned gas pressure chamber and opening and closing the aforementioned gas exhaust passage, it is possible to cause the piezoelectric valve to perform stable and reliable opening and closing operations at a high speed.

Effect of the Invention

According to the present invention described above, it is possible to remove a resonance frequency component of a piezoelectric actuator and cause an operating body such as a valve body to perform an appropriate operation, and, in addition, possible to provide a novel and useful piezoelectric actuator in which an accurate drive system can be configured through an analysis or the like without relying on actual parts matching or the like.

BRIEF DESCRIPTION OF THE DRAWINGS

FIG. 7 is a graph in which the functions of the first filter processing unit and a second filter processing unit in the embodiment are illustrated together.

MODE FOR CARRYING OUT THE INVENTION

Hereinafter, an embodiment of the present invention is described with reference to the drawings.

Figure 1:
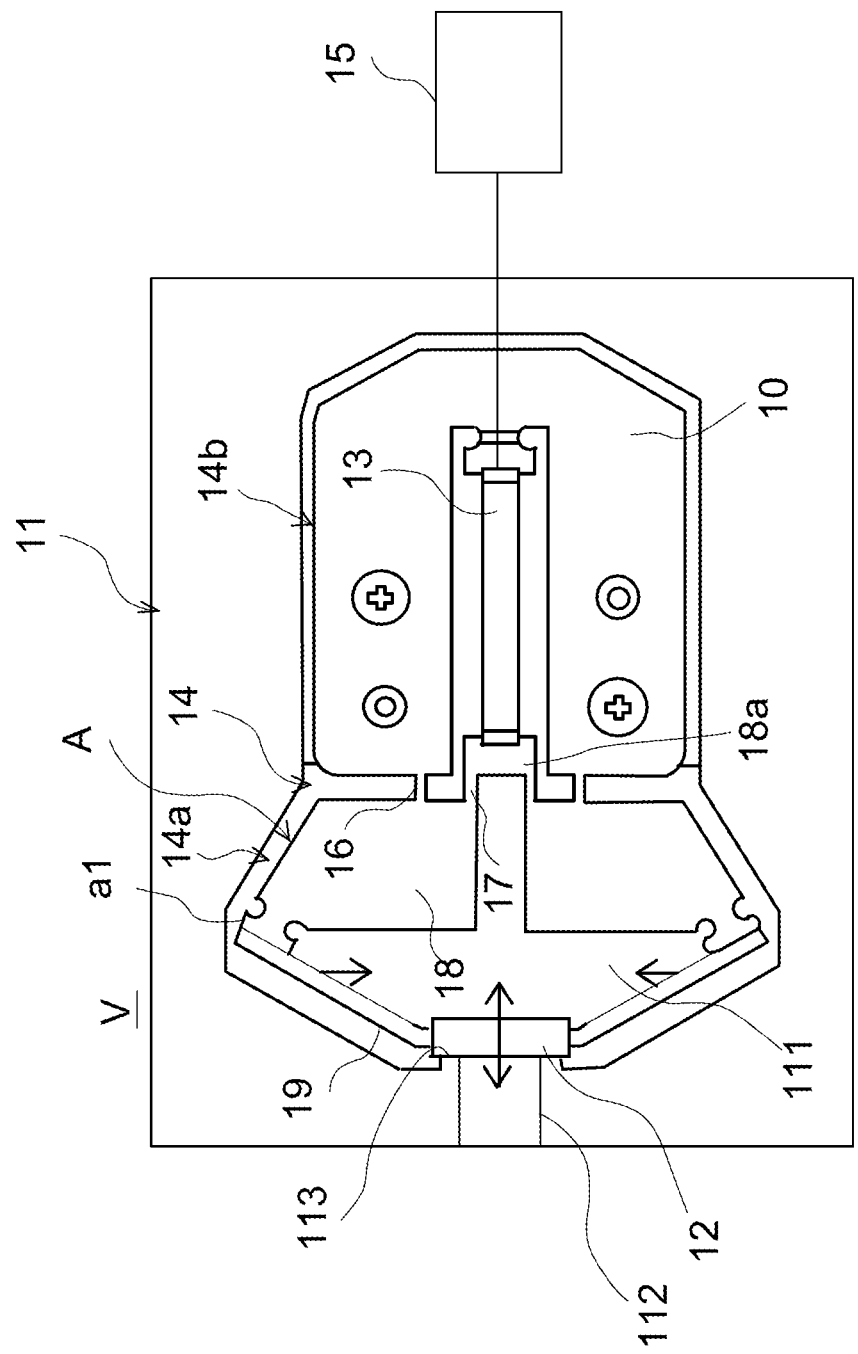
FIG. 1 is a diagram showing a piezoelectric actuator adopting a driving method according to an embodiment of the present invention, in a state of being incorporated in a piezoelectric valve.

FIG. 1 is a V diagram showing a piezoelectric valve V of this embodiment, and the piezoelectric valve V includes: a valve main body 11 in which a gas pressure chamber 111 receiving compressed gas supplied from an outside and a gas exhaust passage 112 exhausting the compressed gas from the gas pressure chamber 111 are formed; and a valve body 12 which is disposed in the aforementioned gas pressure chamber 111 and opening and closing the gas exhaust passage 112. Then, a piezoelectric actuator A having this valve body 12 as an operating body is configured to be integrally incorporated in the valve main body 11.

The piezoelectric actuator A includes, as a basic configuration: a piezoelectric element 13 which generates, as a displacement, a driving force necessary for an operation of a valve body 12 which is an operating body; a displacement enlarging mechanism 14 including at least a spring element so as to enlarge the displacement of this piezoelectric element 13 which acts on the aforementioned valve body 12; and a driving device 15 which operates the valve body 12 that is the aforementioned operating body by applying a voltage to the aforementioned piezoelectric element 13 to extend the piezoelectric element 13.

The aforementioned valve body 12 is disposed in the gas pressure chamber 111 of the valve main body 11 at a position for opening and closing the gas exhaust passage 112.

The aforementioned piezoelectric element 13 is disposed inside a U-shaped base substrate 10 of the aforementioned valve main body 11, that will be described later.

The aforementioned displacement enlarging mechanism 14 is disposed in the aforementioned gas pressure chamber 111 of the aforementioned valve main body 11, and enlarges the displacement of the aforementioned piezoelectric element 13 which acts on the aforementioned valve body 12.

The aforementioned driving device 15 includes: a charging drive circuit (not shown) which applies a drive voltage to the aforementioned piezoelectric element 13 to charge an electric charge, thereby extending the piezoelectric element 13; and a discharging drive circuit (not shown) which discharges the aforementioned charged electric charge and contracts the aforementioned piezoelectric element 13, and extends and contracts the aforementioned piezoelectric element 13, thereby driving the aforementioned valve body 12 to open and close.

The aforementioned displacement enlarging mechanism 14 includes: a displacement enlarging section 14a which enlarges the displacement of the aforementioned piezoelectric element 13; and a displacement transmitting section 14b which transmits the displacement of the aforementioned piezoelectric element 13 to the aforementioned displacement enlarging section 14a.

The aforementioned displacement transmitting section 14b includes the U-shaped base substrate 10 to which a one end of the aforementioned piezoelectric element 13 is joined and a cap member 18a to which another end of the aforementioned piezoelectric element 13 is joined.

The aforementioned piezoelectric element 13 is incorporated in a space of the aforementioned U-shaped base substrate 10 between a U-shaped bottom section and the aforementioned cap member 18a, and the aforementioned one end is joined to the aforementioned base substrate 10, and the aforementioned other end is joined to the aforementioned cap member 18a.

The displacement transmitting section 14b and the displacement enlarging section 14a are configured to include a first hinge 16, a second hinge 17, a first arm member 18 and a leaf spring 19. A one end of the first hinge 16 is joined to the base substrate 10. A one end of the second hinge 17 is joined to the cap member 18a attached to the aforementioned piezoelectric element 13. Both other ends of the first hinge 16 and the second hinge 17 are joined to a base of the arm member 18. A one end of the leaf spring 19 is joined to an outer leading end part of the arm member 18, and an inner end of the leaf spring 19 is joined to a nearest end of the valve body 12.

In the piezoelectric valve V, in a state of FIG. 1, when a drive voltage is applied to the piezoelectric element 13 by the driving device 15 to charge the electric charge, the piezoelectric element 13 extends in a left direction in the figure. The displacement caused by the extension of the piezoelectric element 13 is enlarged by a principle of leverage in the displacement enlarging mechanism 14 with the second hinge 17 as a force point, the first hinge 16 as a supporting point, and the leading end part of the arm member 18 as an action point, and the outer leading end part of the arm member 18 is largely displaced in a direction in which a distance between a pair of the arm members 18, 18 extends.

Then, the displacement at each of the outer end leading part of the pair of the arm members 18, 18 separates the valve body 12 from a valve seat 113 via a pair of leaf springs 19, 19 and opens the gas exhaust passage 112.

Meanwhile, in the piezoelectric valve V, when the abovementioned piezoelectric element 13 discharges electric charge by the driving device 15, the piezoelectric element 13 contracts and the contraction is transmitted to the valve body 12 through the displacement enlarging mechanism 14, and the valve body 12 sits on the valve seat 113. The spring element of the displacement enlarging mechanism 14 resonates in a same mode as a series of operation modes of the aforementioned displacement enlarging mechanism. Although the resonance frequency of the pair of leaf springs 19, 19 is also influenced by a structure, it is generally considered that the resonance frequency is very high and resonance vibration is small.

Figure 2:
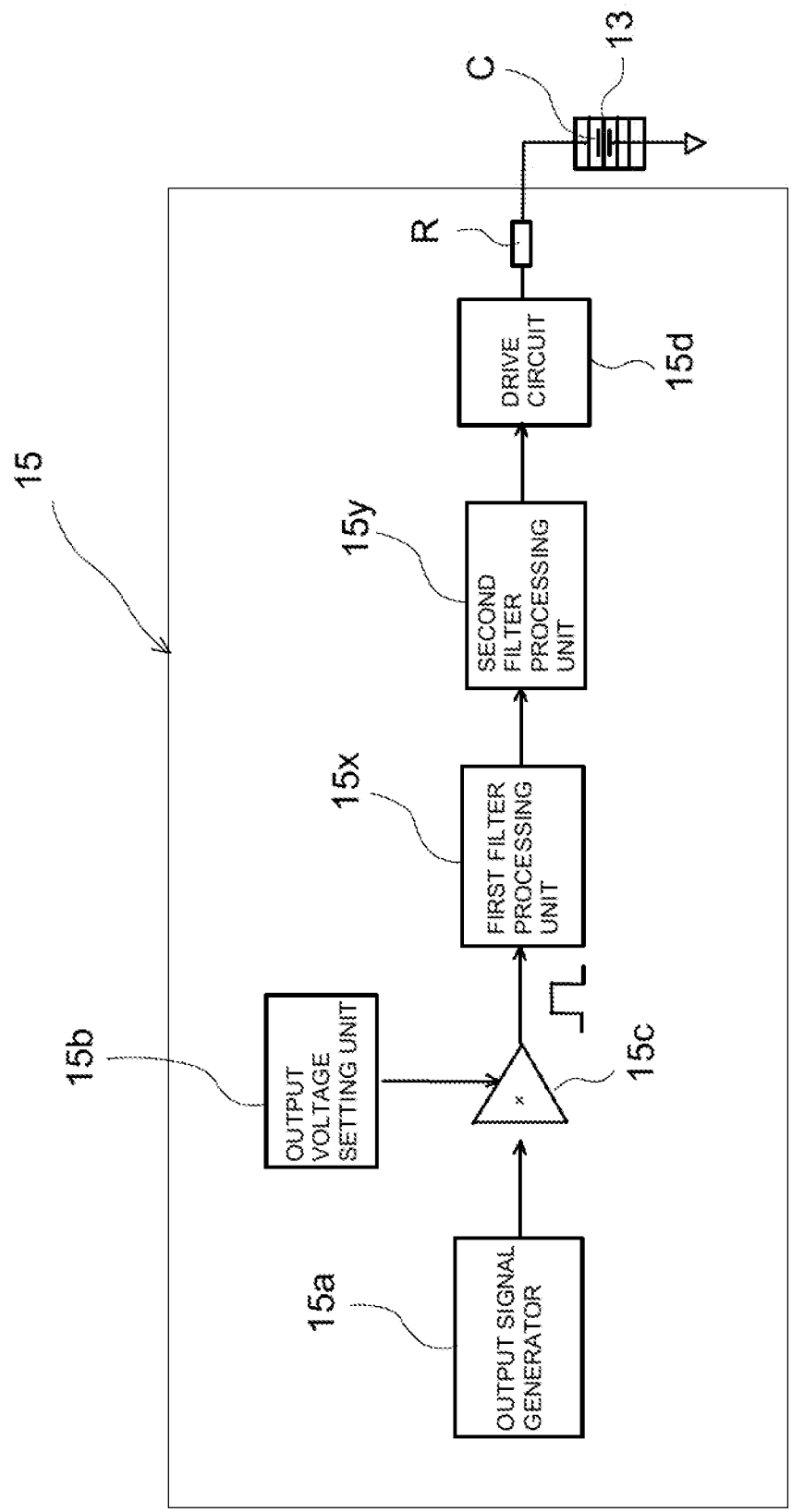
FIG. 2 is a control block diagram showing a driving device constituting the piezoelectric actuator according to the embodiment.

In such a configuration, the driving device (controller) 15 shown in FIG. 2 originally inputs to a drive circuit 15d, a drive pulse obtained by multiplying, an output signal waveform (pulse waveform) generated by an output signal generator 15a by a voltage level value set by an output voltage setting unit 15b, by a multiplication unit 15c, to generate a drive voltage for the piezoelectric element 13. On the other hand, the present embodiment incorporates: a first filter processing unit 15x as a resonance suppression processing unit having an inverse function characteristic of a mechanical resonance frequency when operating the aforementioned displacement enlarging mechanism 14; and a second filter processing unit 15y as a delay compensation processing unit having an inverse characteristic of an electrical driving characteristic causing a delay when driving the aforementioned piezoelectric element 13, and is configured to apply, a voltage in which an influence of the aforementioned mechanical resonance is reduced, to the aforementioned piezoelectric element 13 through the first filter processing unit 15x, and to apply, a voltage in which an influence of the aforementioned electrical driving characteristic is reduced, to the aforementioned piezoelectric element 13 through the second filter processing unit 15y.

Figure 3:
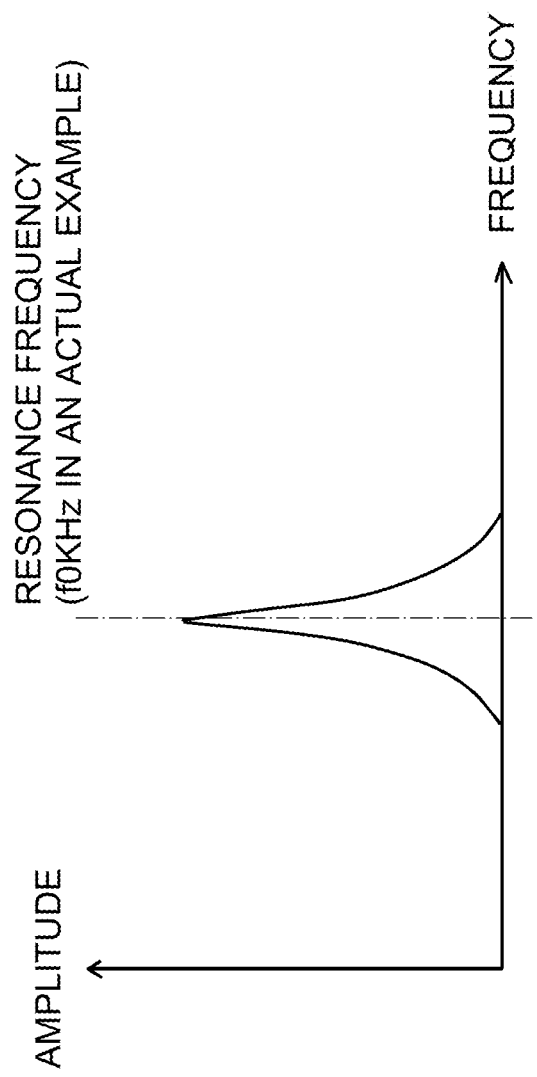
FIG. 3 is a diagram showing a resonance frequency characteristic of the piezoelectric actuator according to the embodiment.
Figure 4:
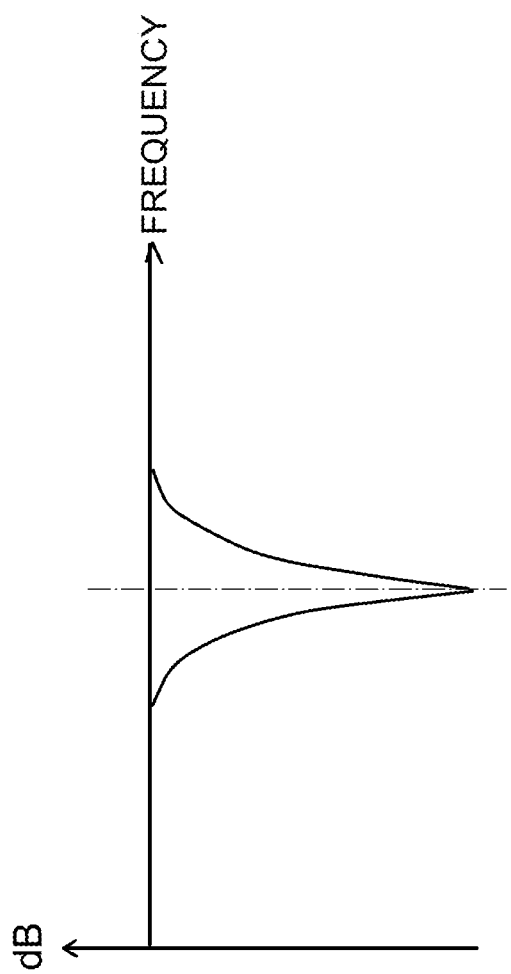
FIG. 4 is a graph showing a function of a first filter processing unit which is a resonance suppression processing unit according to the embodiment.

The first filter processing unit 15x is configured by a notch filter. The mechanical resonance frequency characteristic of an actuator main body al (see FIG. 1) constituting the piezoelectric actuator A can be determined from an analysis or the like, and from an excitation form, only a vibration mode as shown by an arrow in FIG. 1 appears. Therefore, a resonance frequency of f0KHz as shown in FIG. 3 can be determined. In the first filter processing unit 15x, in order to remove this frequency component from a square wave coming out of a multiplier 15c, the first filter processing unit 15x, as shown in FIG. 4, implements as a notch filter of an inverse characteristic of the mechanical resonance frequency characteristic, and outputs through this notch filter a waveform from which the resonant frequency component has been removed. A type of notch can be set by a center frequency, a width, and a gain of the notch. A reason why this first filter processing unit 15x is not a low pass filter is that the low pass filter does not have a frequency component higher than the mechanical resonance of the actuator main body al, and thus a response delay occurs. If the response delay is acceptable, the low pass filter may be adopted as the first filter processing unit 15x.

Figure 5:
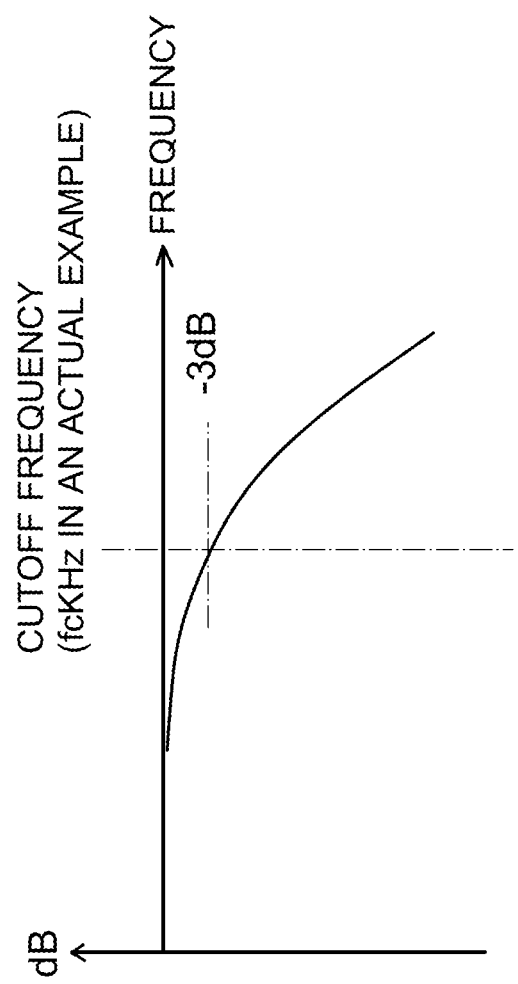
FIG. 5 is a graph showing an electrical driving characteristic when driving the piezoelectric actuator according to the embodiment.
Figure 6:
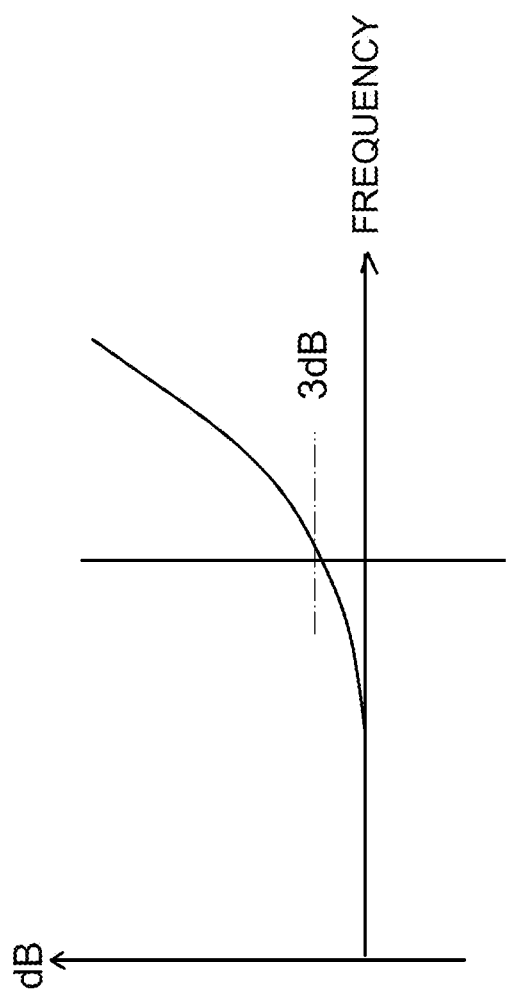
FIG. 6 is a graph showing a function of a second filter processing unit which is a delay compensation processing unit according to the embodiment.

Returning to FIG. 2, the signal waveform from the notch filter used in the first filter processing unit 15x is input to the second filter processing unit 15y. The piezoelectric element 13 moves by voltage, and thus lags the current. Focusing on an electrical characteristic, in this embodiment, a low-pass filter with a cutoff frequency of fcKHz at −3 dB is formed as shown in FIG. 5, on the basis of an output impedance R of a control means 15 and a capacitance component C of a piezoelectric element main body. Therefore, as shown in FIG. 6, the second filter processing unit is configured to have a characteristic of a high pass filter that is an inverse function of the abovementioned low pass filter characteristic, and the signal waveform output from the first filter processing unit 15x is passed through the second filter processing unit 15y, thereby compensating a delay based on the electrical characteristic and further improving responsiveness. The output impedance R of the control means 15 and the capacitance component C of the piezoelectric element 13 can be easily calculated from design values of the drive circuit 15d of the driving device 15 and the piezoelectric element 13.

FIG. 7 illustrates together the characteristic of the first filter processing unit 15x and the characteristic of the second filter processing unit 15y, which are combined to form an entire filter function. In this embodiment, a filter is digitally configured with the use of a microcomputer. Specifically, a filter function combining the characteristics shown in FIG. 7 is tabulated, digital values are extracted from a table at a predetermined update pitch for a pulse signal output from the multiplier 15c and converted into analog data by a DA converter, and a voltage after filtering is applied to the piezoelectric element 13 through the drive circuit 15d. Of course, it is needless to say that these filter processing units 15x and 15y may be configured to perform filtering by giving a calculation formula to a microcomputer, or may be configured by an analog circuit.

Figure 8A:
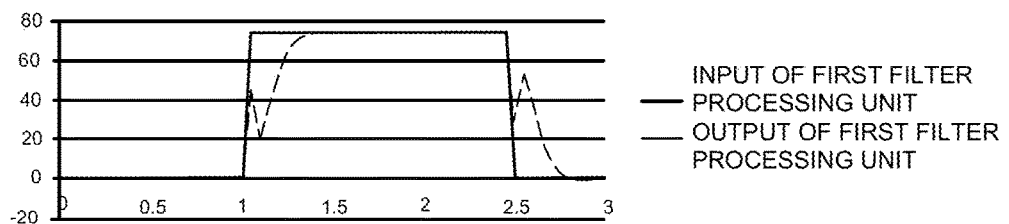
FIGS. 8A to 8D are graphs showing how a voltage waveform changes from generation of a pulse command voltage to application of same to a piezoelectric element in the embodiment.
Figure 8B:
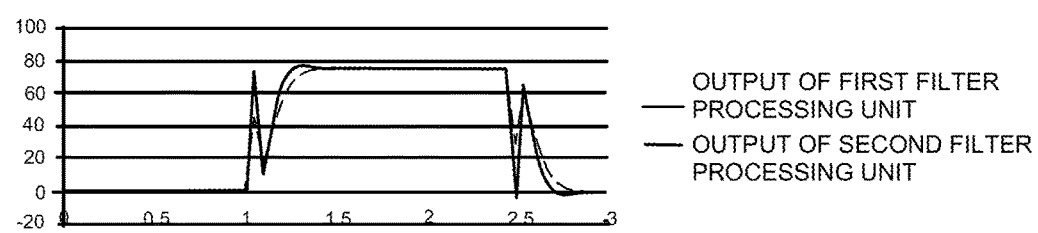
Figure 8C:
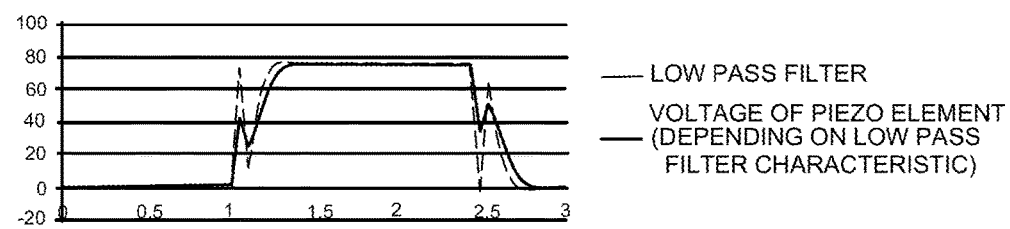
Figure 8D:
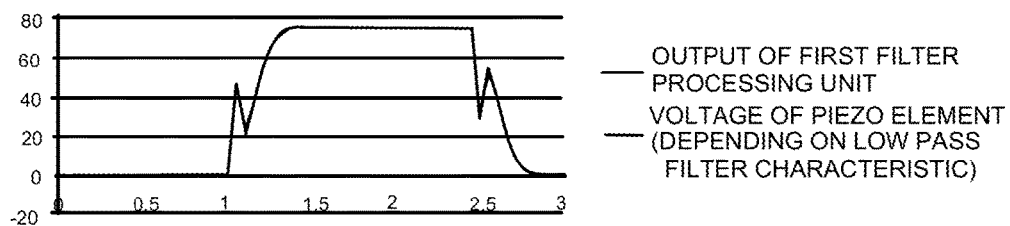

FIG. 8A illustrates together an input waveform and an output waveform to the first filter processing unit 15x, and it is originally desirable to apply this output waveform to the piezoelectric element 13. In this embodiment, since the second filter processing unit 15y is provided, a voltage waveform is once amplified by the second filter processing unit 15y as shown in FIG. 8B. After that, under the influence of a low pass filter composed of the output impedance R of the drive circuit 15d and the capacitance component C of the piezoelectric element 13, the final applied voltage waveform of the piezoelectric element 13 becomes as shown in FIG. 8C, which corresponds to an output waveform from the first filtering unit as illustrated together in FIG. 8D. That is, it is understood that a voltage can be applied to the piezoelectric element 13 with a voltage waveform that is output from the first filter processing unit 15x and originally desired to be applied while reducing an influence due to electrical characteristics.

Figure 9A:
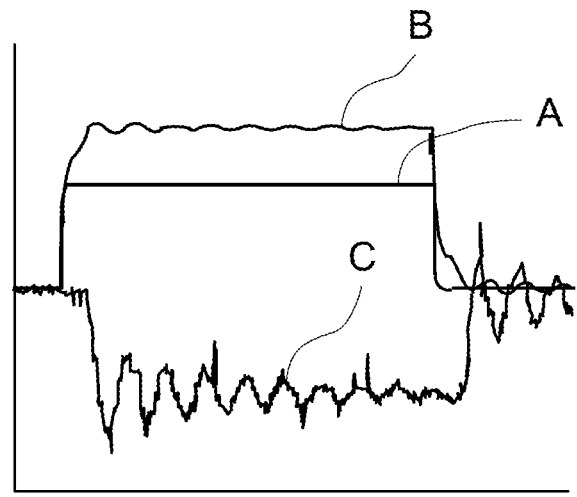
FIGS. 9A to 9C are graphs showing a relation between a voltage waveform applied to the piezoelectric element and a displacement of a valve which is an operating body in the embodiment in a case of a pulse output in comparison with a case of a two-stage output.
Figure 9B:
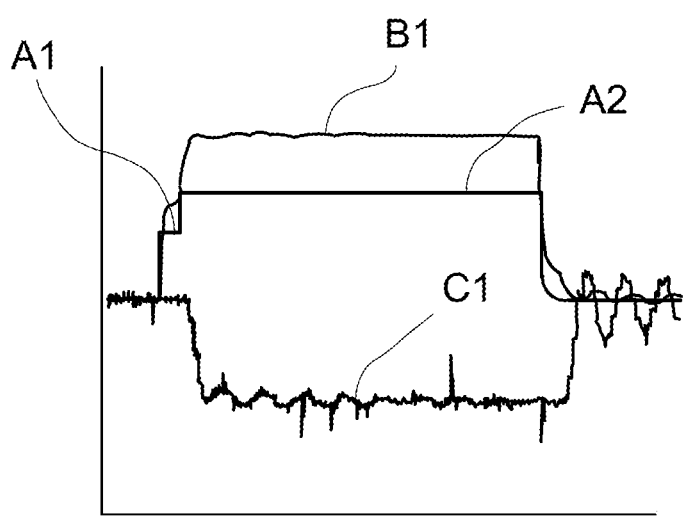
Figure 9C:
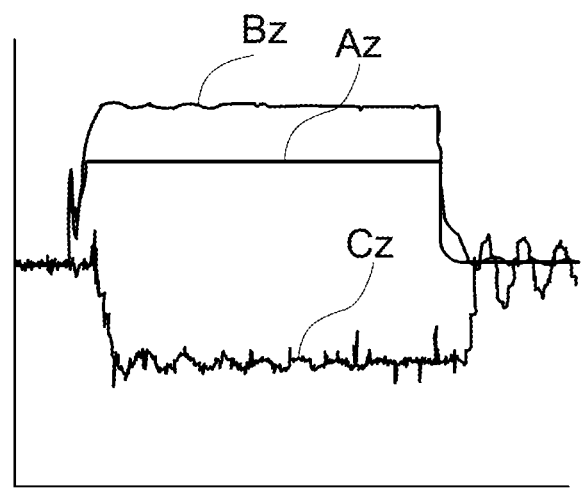

FIGS. 9A to 9C show comparison data. FIG. 9A shows an applied voltage waveform B to the piezoelectric element 13 and a measured waveform of a displacement C of the valve 12 when a circuit is formed with a configuration in a case where the first and second filter processing units 15x and 15y shown in FIG. 2 are not present and the pulse output A is applied. How the valve is vibrating can be seen. Meanwhile, FIG. 9B shows the applied voltage waveform B to the piezoelectric element 13 and a displacement C1 of a valve in a case where, in a stepwise driving method of cited document 1, a pulse signal A2 is input and a pulse signal A1 of a first stage as a voltage lower than the A2 is input in a previous state stepwise, and it can be seen that the vibration of the valve 12 is improved. On the other hand, FIG. 9C shows a measurement result of the present embodiment in a case where the first and second filter processing units 15x and 15y shown in FIG. 2 are provided, and Az is an output waveform through the first and second filter processing units 15x and 15y, Bz is a voltage waveform applied to the piezoelectric element, and Cz is a displacement of the valve. It can be seen that a stable result is obtained for the displacement of the valve 12. The resonance vibration suppression can be further improved by speeding up the update pitch of the DA converter and bringing same closer to an analog waveform. However, even the illustrated state is sufficiently practical. While all the comparison data in FIGS. 9A to 9C are confirmed only by an extension operation, a same effect is obtained in a reduction operation.

While the pre-pulse method has not been evaluated, it is presumed that a same waveform will be obtained as the present embodiment is roughened. However, adjustment is considered to be difficult due to actual parts matching.

As described above, in both prior art documents 1 and 2, the actual parts matching needs to be performed while performing tuning by trial and error, at the same time, measuring a pulse width and a pulse height of a first stage pulse or prepulse and an interval between the prepulse and a main pulse; however, since the present invention can obtain an inverse characteristic in advance from design values and analysis results, it is possible to easily construct an appropriate filter.

Furthermore, even if adaptability of a filter is deteriorated due to aging of the piezoelectric element 13 or the drive circuit 15d, in a case of a notch filter or a high pass filter, modification of a filter function can also be easily done on the basis of how much the filter deviates from a center frequency or a reference frequency in which direction.

As stated above, according to the present embodiment, the resonance frequency component of the piezoelectric actuator A is removed from the drive voltage applied to the piezoelectric element 13 by the notch filter of the first filter processing unit 15x, and thus vibration due to the mechanical resonance of the piezoelectric actuator A is eliminated and suppressed.

In addition, since the frequency component higher than the resonance frequency of the mechanical resonance is included as compared with a low pass filter, the response speed can be increased.

Furthermore, responsiveness can be further improved by an inverse function of a low pass filter composed of a driver and a load of the second filter processing unit 15y.

In addition, the command voltage in the present embodiment is a pulse voltage obtained by multiplying, an output signal waveform (pulse waveform) generated by the output signal generator 15a by a voltage level value set by the output voltage setting unit 15b, by the multiplication unit 15c. Only a height of an entire pulse is changed by the multiplication, and a pulse waveform which is a voltage command is not changed as a first voltage and a second voltage in a stepwise manner in two steps or multiple stages in such a manner as in the prior art document 1, and in addition, a signal generation unit does not generate a signal separated into a prepulse and a main pulse in such a manner as in the prior art document 2.

As mentioned above, while one embodiment of the present invention has been described, the specific structure of each part is not limited to only the embodiment described above, various modifications can be made without departing from the spirit of the present invention.

For example, in the above embodiment, while the controller which is the driving device, includes the first filter processing unit and the second filter processing unit, the operation and effect according to the above can be exhibited even with the first filter processing unit alone.

In addition, in the above embodiment, while the first filter processing unit is the notch filter and the second filter processing unit is the high pass filter, the present invention is not limited to this as long as the effects of the present invention can be obtained.

Furthermore, in the above embodiment, while the resonance suppression processing unit and the delay compensation processing unit are configured by the filter, it is also possible to implement these by a function not belonging to a concept of the filter.

Other than those, various modifications can be made without departing from the spirit of the present invention, such as application of this piezoelectric actuator to a use other than piezoelectric valves.

INDUSTRIAL APPLICABILITY

The present invention can be effectively used as a piezoelectric actuator and a piezoelectric valve which drive an object by enlarging a displacement of a piezoelectric element (piezo element).

DESCRIPTION OF REFERENCE NUMERALS

11 . . . Valve main body
12 . . . Operating body (valve body)
13 . . . Piezoelectric element
14 . . . Displacement enlarging mechanism
15 . . . Driving device (controller)
15x . . . Resonance suppression processing unit (first filter processing unit)
15y . . . Delay compensation processing unit (second filter processing unit)
19 . . . Leaf spring
111 . . . Gas pressure chamber
112 . . . Gas exhaust passage
A . . . Piezoelectric actuator
V . . . Piezoelectric valve

The invention claimed is:

1. A piezoelectric actuator comprising:
a piezoelectric element configured to generate, as a displacement, a driving force necessary for an operation of an operating body;
a displacement enlarging mechanism partially including at least a spring element so as to enlarge a displacement of the piezoelectric element which acts on the operating body; and
a driving device configured to operate the operating body by applying a voltage to the piezoelectric element to extend the piezoelectric element,
wherein the driving device comprises a resonance suppression processing unit having an inverse function characteristic of a mechanical resonance frequency when operating the displacement enlarging mechanism, and is configured to apply, a voltage in which the mechanical resonance is reduced, to the piezoelectric element through the resonance suppression processing unit.

2. The piezoelectric actuator according to claim 1, wherein the driving device comprises a delay compensation processing unit having an inverse characteristic of an electrical driving characteristic causing a delay when driving the piezoelectric element, and is configured to apply, a voltage which reduces an influence of the electrical driving characteristic, to the piezoelectric element through this delay compensation processing unit.

3. A piezoelectric valve using the piezoelectric actuator according to claim 2, the piezoelectric valve comprising:
- a valve main body in which a gas pressure chamber receiving compressed gas supplied from an outside and a gas exhaust passage exhausting the compressed gas from the gas pressure chamber are formed; and
- a valve body which is an operating body disposed in the gas pressure chamber and opening and closing the gas exhaust passage.

4. The piezoelectric actuator according to claim 2, wherein the resonance suppression processing unit is a notch filter, and the delay compensation processing unit is a high pass filter.

5. A piezoelectric valve using the piezoelectric actuator according to claim 4, the piezoelectric valve comprising:
- a valve main body in which a gas pressure chamber receiving compressed gas supplied from an outside and a gas exhaust passage exhausting the compressed gas from the gas pressure chamber are formed; and
- a valve body which is an operating body disposed in the gas pressure chamber and opening and closing the gas exhaust passage.

6. The piezoelectric actuator according to claim 2, wherein the resonance suppression processing unit is a notch filter.

7. A piezoelectric valve using the piezoelectric actuator according to claim 6, the piezoelectric valve comprising:
- a valve main body in which a gas pressure chamber receiving compressed gas supplied from an outside and a gas exhaust passage exhausting the compressed gas from the gas pressure chamber are formed; and
- a valve body which is an operating body disposed in the gas pressure chamber and opening and closing the gas exhaust passage.

8. A piezoelectric valve using the piezoelectric actuator according to claim 1, the piezoelectric valve comprising:
- a valve main body in which a gas pressure chamber receiving compressed gas supplied from an outside and a gas exhaust passage exhausting the compressed gas from the gas pressure chamber are formed; and
- a valve body which is an operating body disposed in the gas pressure chamber and opening and closing the gas exhaust passage.

9. The piezoelectric actuator according to claim 1, wherein the resonance suppression processing unit is a notch filter.

10. A piezoelectric valve using the piezoelectric actuator according to claim 9, the piezoelectric valve comprising:
- a valve main body in which a gas pressure chamber receiving compressed gas supplied from an outside and a gas exhaust passage exhausting the compressed gas from the gas pressure chamber are formed; and
- a valve body which is an operating body disposed in the gas pressure chamber and opening and closing the gas exhaust passage.

* * * * *